United States Patent

[11] 3,586,017

| [72] | Inventor | William R. Walters<br>1300 Sunset, Pawhuska, Okla. 74056 |
|---|---|---|
| [21] | Appl. No. | 784,002 |
| [22] | Filed | Dec. 16, 1968 |
| [45] | Patented | June 22, 1971 |

[54] ANTIFREEZING LIQUID LEVEL REGULATING CONTROL
7 Claims, 5 Drawing Figs.

[52] U.S. Cl. .................................................. 137/59,
137/389, 137/403, 236/12
[51] Int. Cl. ........................................................F16k 21/18,
E03b 7/12
[50] Field of Search ............................................ 137/59,
386, 389, 403, 406, 90; 236/12

[56] References Cited
UNITED STATES PATENTS

| 2,509,839 | 5/1950 | Panner ......................... | 137/515.5 |
| 2,620,818 | 12/1952 | Symmons ...................... | 137/403 |
| 3,384,109 | 5/1968 | Stroburg et al. ............... | 137/434 |
| 3,386,462 | 6/1968 | Walters ......................... | 137/406 X |
| 2,550,050 | 4/1951 | Emerson et al. ............... | 137/90 X |

Primary Examiner—M. Cary Nelson
Assistant Examiner—Richard Gerard
Attorneys—Clarence A. O'Brien and Harvey B. Jacobson ABSTRACT: A water level controlling apparatus submerged within a water receptacle for conducting water under pressure into the receptacle in order to maintain a predetermined level of water therein. A limited amount of additional water is admitted to the receptacle under control of a temperature sensor in order to prevent freezing of the water.

PATENTED JUN22 1971 3,586,017
SHEET 1 OF 2
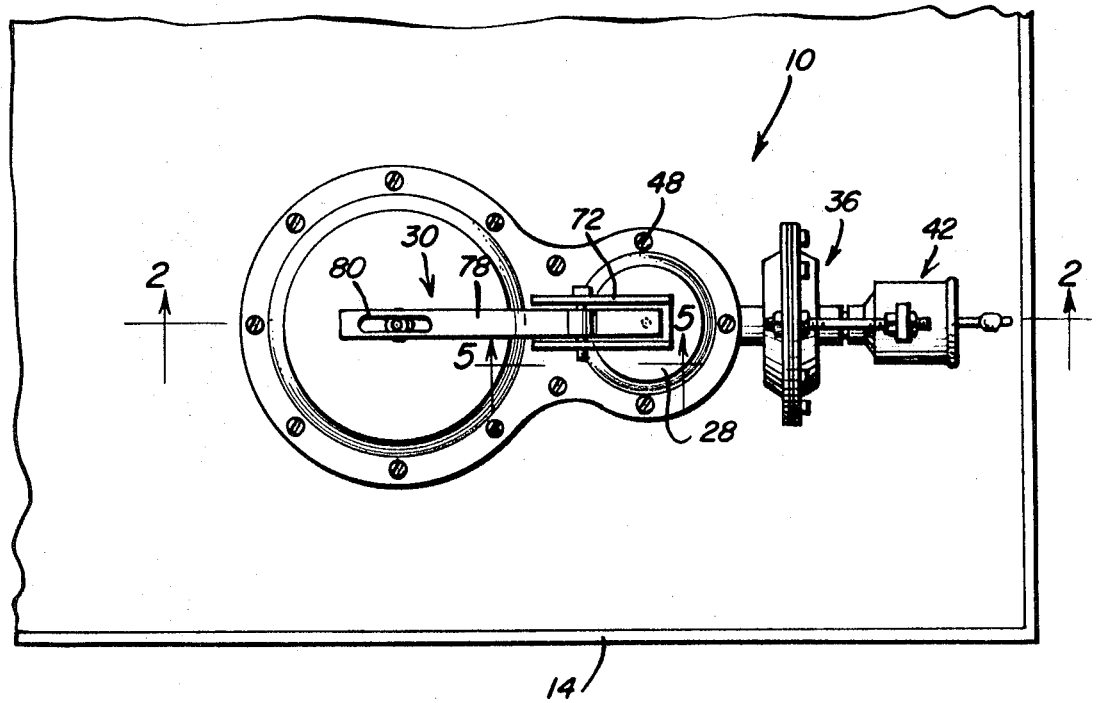
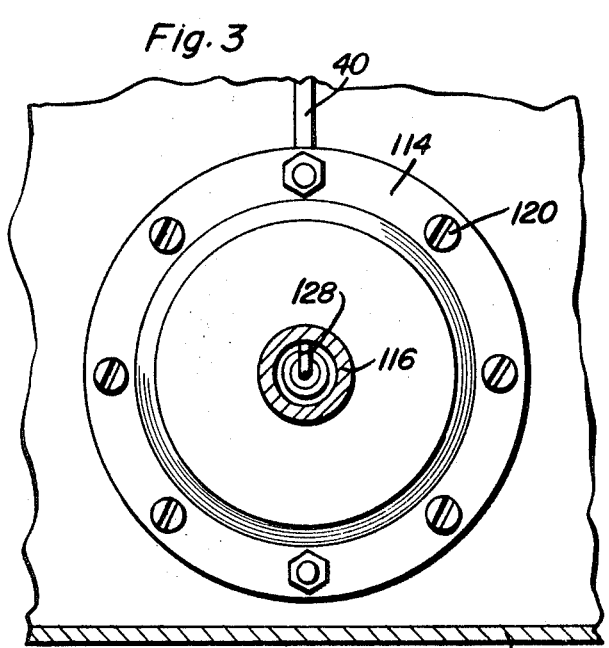
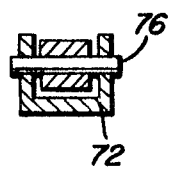
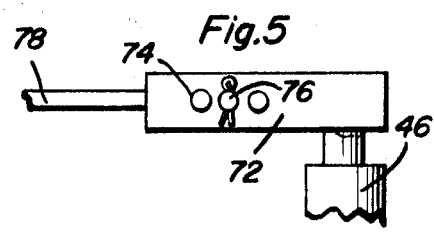
William R. Walters
INVENTOR.

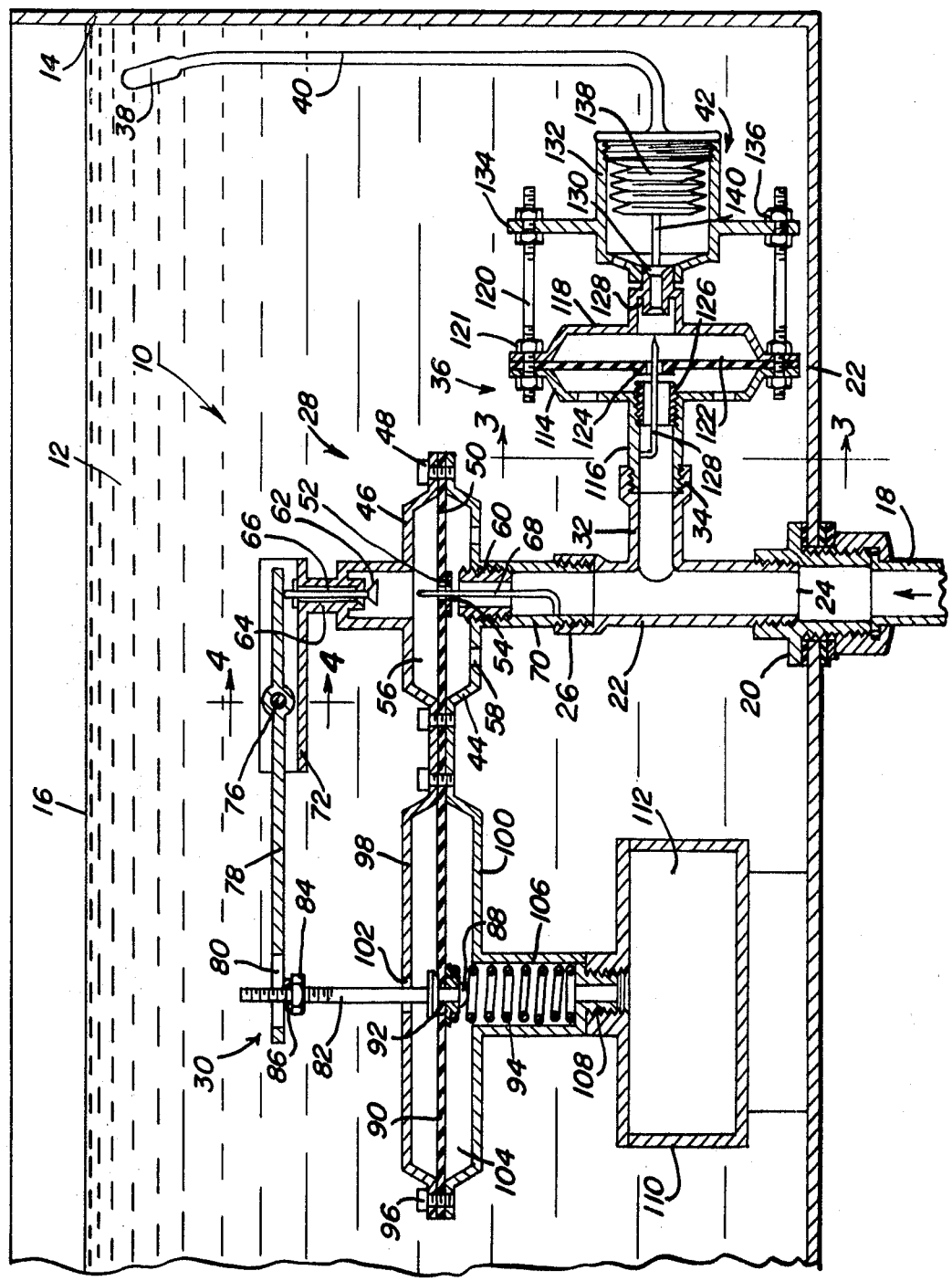

ANTIFREEZING LIQUID LEVEL REGULATING CONTROL

This invention relates to apparatus for maintaining a predetermined water level within receptacles as well as to exercise some control over its temperature.

There are many water level controllers which generally function to maintain a predetermined water level. However, there are certain environments where most water level controllers are unsuitable. For example, some water level controllers cannot operate when fully submerged since they require air venting. Other level controllers operate on a float principle which may not be reliable particularly where the surface of the water is exposed. For example, a float controlled water level maintaining apparatus may be unsuitable for a cattle watering trough. Atmospheric or ambient temperature presents another problem for water level controllers utilized in an exposed environment.

The present invention successfully copes with the aforementioned problems by providing a water level controlling apparatus capable of operating in a fully submerged condition, without reliance on any float controls and having facilities for preventing freezing of the water stored in a receptacle housing the apparatus.

In accordance with the present invention, the water level controller includes an inlet conduit connected to a source of water under pressure to which the water storing receptacle is connected. A flow control valve assembly regulates the inflow of water to the receptacle when opened. Opening of the flow control device is effected against the closing bias of a differential pressure valve, the closing bias being decreased when the level of the water within the receptacle drops below a predetermined level. The level sensing mechanism is in the form of a differential pressure actuator exposed to the opposing pressures of the water within the receptacle and the pressure of air trapped within an air chamber. A second flow control device is provided in order to regulate the inflow of water under pressure from the source to the receptacle whenever the temperature of the water reaches an extreme value. Thus a sensor is located just below the level of the water and controls the second flow control valve to admit a limited quantity of water from the source which will be at a relatively higher temperature than the water already in the receptacle. The higher temperature water and the pressure thereof as it enters the receptacle will thereby prevent freezing of the water stored within the receptacle in one embodiment of the invention.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view of the water level controlling apparatus of the present invention shown installed adjacent a corner of a water containing receptacle.

FIG. 2 is an enlarged side sectional view taken substantially through a plane indicated by section line 2-2 in FIG. 1.

FIG. 3 is an enlarged partial sectional view taken substantially through a plane indicated by section line 3-3 in FIG. 2.

FIG. 4 is a transverse sectional view taken substantially through a plane indicated by section line 4-4 in FIG. 2.

FIG. 5 is a partial side elevational view of a portion of the apparatus as viewed from section line 5-5 in FIG. 1.

Referring now to the drawings in detail, FIGS. 1 and 2 illustrate a liquid level controlling apparatus generally denoted by reference numeral 10 mounted submerged within a body of water 12 stored within a receptacle 14 adjacent one corner thereof. The apparatus 10 is operative to maintain a predetermined water level 16 as shown in FIG. 2. Whenever the water drops below this predetermined level, additional water is supplied to the receptacle from any suitable source such as a water pressure main connected to the receptacle by the water supply conduit 18 shown in FIG. 2. The conduit 18 is accordingly connected by the threaded inlet fitting 20 to the bottom 22 of the receptacle.

The water level controlling apparatus 10 includes an inlet conduit 22 threadedly connected at its lower end 24 to the inlet fitting 20 for communication with the water supply conduit 18. The upper, internally threaded end 26 of the inlet conduit is threadedly connected to a first flow control device 28 through which water is conducted into the receptacle whenever the body of water 12 drops below the predetermined level 16, flow being cutoff as soon as this level is restored. Opening and closing of the flow control device 28 is effected through a differential pressure actuating mechanism generally referred to by reference numeral 30 which responds to any changes in the water level. The inlet conduit is provided with a branch 32 extending at right angles therefrom having an internally threaded end 34 to which a second flow control device 36 is connected through which a limited amount of water is admitted when the temperature of the water body 12 reaches an extreme or limit value as will be hereafter explained. A temperature sensing bulb 38 is accordingly located adjacent the level of the water and preferably close to the side of the receptacle 14 as shown in FIG. 2 in order to sense water at 32° F. for example. In this regard, it will be appreciated that freezing of the water may be localized adjacent the wall of the receptacle and close to the top surface level. A sensing tube 40 connects the sensor bulb 38 to the temperature regulating portion 42 of the apparatus.

A two section housing is associated with the flow control device 28, the housing having a lower section 44 and an upper section 46, the two sections being peripherally secured to each other by a plurality of fasteners 48. Peripherally anchored between the housing sections, is a diaphragm element 50 on which a flow controlling valve disc 52 is mounted. The disc valve element is provided with a central aperture 54 aligned with an aperture formed in the diaphragm element 50 through which a restricted flow of water is conducted from the inlet conduit 22 into a pressure chamber 56 located above the diaphragm element 50 within the housing section 46. Water is also conducted through the lower housing section 44 and the outlet ports 58 into the receptacle when the valve disc 52 is in its open position as illustrated in FIG. 2. An externally threaded valve seat member 60 is mounted by the housing section 44 in closely spaced axial alignment with the valve disc 52. It will be apparent therefore, that when the pressure of the liquid within the pressure chamber 56 increases sufficiently, the pressure responsive diaphragm element 50 will be downwardly displaced so as to move the valve disc 52 into a closed position engaging the upper axial end of the valve seat 60. Flow of fluid from the inlet conduit into the receptacle will then be blocked. Thus, the static pressure of the liquid within the receptacle is applied to the underside of the diaphragm element 50 tending to hold the valve disc 52 in its open position against the bias of the liquid pressure in chamber 56 applied to the top side of the diaphragm element 50. The valve closing biasing pressure of the liquid within chamber 56 is controlled by a valve element 62 adapted to be upwardly displaced to a valve closing position engaging the lower end of the valve seat portion 64 of the upper housing section 46. The pressure of the liquid within the chamber 56 tends to upwardly displace the valve element 62 to its closed position. The pressure controlling valve 62 is however opened by means of the differential pressure actuating mechanism 30 engaging the upper end of the valve stem 66. When opened, water is conducted through the valve seat 60 into the lower housing section 44 and out through the outlet ports 58 into the receptacle. A restricted flow of water is also conducted through the central opening 54 in the valve disc 52. In order to prevent the opening 54 from becoming clogged with solid matter, a cleaning needle 68 is fixedly mounted by the axial portion 70 of the lower housing section and projects upwardly therefrom through the valve seat 60 and the openings in the valve disc 52 and the diaphragm element 50. Thus, as water is conducted into the receptacle a restricted flow thereof also is conducted into the pressure chamber 56 to slowly increase the pressure therein closing the valve 62. When valve 62 closes, the pressure rises rather rapidly within the pressure chamber 56 to close the valve disc 52 and thereby interrupt the inflow of water into the receptacle from the pressure source. Closing of the valve 62 is however permitted only if the body of water 12 within the receptacle has reached its predetermined level 16.

The differential pressure actuator 30 includes a channel-shaped member 72 fixedly mounted on top of the upper housing section 46 of the flow control device 28 as shown in FIGS. 1, 2, and 5. Extending through one pair of a plurality of aligned openings 74 in the upwardly extending leg portions of the channel member 72, is a fulcrum pin 76 by means of which an actuating lever 78 is pivotally mounted. The valve stem 66 engages the underside of the actuating lever 78 adjacent one end on a side of the fulcrum pin 76 opposite that end of the actuating lever having an elongated slot 80. The lever 78 is engaged with the threaded end portion of a bolt 82 projecting through the slot 80 at an adjusted location on the bolt. Accordingly, an adjustment nut 84 is mounted on the threaded end portion of the bolt supporting a washer 86 in engagement with the underside of the lever 78 as more clearly seen in FIG. 2. The bolt is connected at its head end 88 with a diaphragm element 90. Mounted on the bolt in abutment with the head 88, is a spring retainer element 92 receiving the upper end of a spring 94 which exerts an upward bias on the diaphragm element 90 and the actuating lever 78 tending to hold the valve element 62 in its open position. The diaphragm element 90 is peripherally anchored by a plurality of circumferentially spaced fasteners 96 between an upper housing section 98 and a lower housing section 100. The bolt 82 extends through a central opening 102 in the upper housing section so that the upper side of the diaphragm element 90 is exposed to the static pressure of the liquid within the receptacle. The underside of the diaphragm element 90 on the other hand is exposed to the pressure of air within chamber 104 of the lower housing section 100 having a tubular extension 106 within which the spring 94 is housed. The tubular extension 106 is provided with a smaller diameter, externally threaded portion 108 threadedly connected to a pressure sealed tank 110 containing a compressible gas such as air. Thus, the air chamber 112 within the tank 110 is in fluid communication with the chamber 104 in the lower housing section 100 to which the underside of the diaphragm element 90 is exposed. The pressure of the air in chamber 112 and the spring force of spring 94 will determine the opening bias exerted on the valve element 62 through the actuating lever 78 while the closing bias will be determined by the pressure of the liquid within the receptacle 14, this pressure being proportional to the water level. When the predetermined water level is attained, the pressure of the water and the opening bias exerted thereby will permit the valve element 62 to closed so as to interrupt the inflow of water through the flow controlling device 28 as aforementioned. The pressure at which the valve 62 will close may be adjusted by changing the location of the fulcrum pin 76 and by changing the location of the adjustment nut 84 in order to set the apparatus for different water levels.

The flow control device 36 is similar in construction and operation to the flow control device 28. Thus, the flow control device 36 includes a housing section 114 connected by its tubular extension 116 to the inlet conduit branch 32. The other housing section 118 is secured to the housing section 114 by assembly rods 120 having opposite threaded ends. Assembly nuts 121 hold the housing sections clamped to each other and to the pressure responsive diaphragm 122 centrally mounting the flow controlling valve disc 124 in axial alignment with the externally threaded valve seat 126. A valve cleaning needle 128 is fixedly mounted by the housing portion 116 for projection through the central openings in the valve disc 124 and diaphragm 122. The housing section 118 also mounts a valve seat portion 128, the outer end of which is adapted to be engaged by a valve element 130 associated with the temperature regulating control 42.

The temperature regulating control includes a tubular housing 132 axially aligned with the valve seat portion 128 of housing section 118 to which it is secured by the assembly rods 120 that extend through the annular flange 134. Assembly nuts 136 clamp the flange 134 and the housing 132 connected thereto in proper axial alignment and spaced relation to the flow control device 36. The housing 132 threadably mounts the valve displacing, temperature regulating component 138 to which the valve 130 is connected by the stem 140. The component 138 as well as the sensor 38 and connecting tube 40 are in themselves well known, the details of which form no part of the present invention.

The flow control device 36 will be closed when the pressure in the housing section 118 rises to a value displacing the diaphragm element 122 in a left-hand direction as viewed in FIG. 2 thereby interrupting inflow of water through the housing section 114. The pressure in housing section 118 will of course rise rapidly whenever the valve element 130 is in its normally closed position as shown in FIG. 2. Accordingly, the flow control device 36 will normally block any inflow of water and will not respond to any changes in the water level as in the case of the flow control device 28. However, should the water approach 32° F. particularly adjacent the upper surface thereof and close to the wall of the receptacle, this condition will be sensed by the sensor 38 which will be operative through the temperature regulator components 138 to displace the valve element 130 to its open position. The pressure of the liquid trapped in housing section 118 will then be vented through the housing 132 to the lower pressure of the liquid within the receptacle so that the diaphragm 122 will move the valve disc 124 to its open position. Fluid under the higher inlet pressure will then flow into the receptacle and since this fluid will be at a higher temperature than the temperature of the water approaching freezing temperature value, freezing of the water will be prevented. Also, the pressure of the water inflow itself will prevent freezing. When the water temperature has risen above 32° to 34° F. for example, the valve element 130 will be closed so that the pressure within the housing section 118 may rise to the value of the inlet water pressure closing the valve disc 124 and thereby interrupting inflow of water.

It should be appreciated, that the temperature sensing component may be replaced by one sensing excessively high temperatures and cooperating with a valve element engaging the end of the valve seat portion 128 opposite the end engaged by the valve element 130 in order to vent the housing section to the lower pressure of the water within the receptacle when the temperature of the water within the receptacle becomes too high. Water at a relatively lower temperature will then be admitted by the flow control device 36 to thereby cool the heated water within the receptacle whereupon the temperature sensing element will close the pressure controlling valve of the flow control device 36 once again to cause interruption in inflow of water.

It will be apparent from the foregoing description, that the level controlling apparatus of the present invention will be particularly useful wherever it is desired to maintain a predetermined level in locations where float controlling components are undesirable as for example in cattle watering troughs. In such an installation, it is also necessary to either provide means for preventing freezing of the water or excessive heating thereof. The foregoing functions are accomplished in a relatively simple and inexpensive manner by apparatus that may also be completely submerged within the water and continue to operate in a reliable manner with a minimum amount of maintenance. Further, adjusting facilities are provided whereby the water may be maintained at different levels in accordance with different requirements.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention.

What I claim as new is as follows:

1. In combination with a receptacle storing liquid supplied thereto from a source of liquid under pressure, a liquid level controlling apparatus submerged within the liquid comprising an inlet conduit connected to said source, a flow control device having a housing connected to the inlet conduit, pressure responsive valve means for blocking flow of liquid from the inlet conduit into the housing and valve-controlled biasing means for exerting a closing bias on the pressure responsive valve means within the housing, said housing having an outlet port conducting liquid under pressure from the source into the receptacle, bias control means connected to the valve-controlled biasing means for reducing said closing bias in response to a decrease in liquid in the receptacle below a predetermined level, a second flow control device for conducting liquid from the inlet conduit into the receptacle and temperature responsive control means operatively connected to the second flow control device for preventing flow therethrough until the temperature of the liquid within the receptacle reaches a predetermined limit.

2. The combination of claim 1 wherein the valve-controlled biasing means for the flow control device comprises a pressure chamber within the housing into which a restricted flow of liquid is conducted through the pressure responsive valve means, and pressure controlling valve means operatively connected to the bias control means for opening and blocking fluid communication between the receptacle and the pressure chamber, the pressure of the liquid developed within the pressure chamber being exerted on the pressure responsive valve means as the closing bias.

3. The combination of claim 2 wherein said bias control means comprises a source of compressible fluid under pressure, and differential pressure means exposed to the pressures of said compressible fluid and the liquid within the receptacle for displacing the pressure controlling valve means between positions opening and blocking fluid communication.

4. The combination of claim 3 wherein the temperature responsive control means comprises a valve displacing device engageable with the associated second flow control device for admitting liquid from the source into the receptacle, and a sensing element located adjacent the predetermined level of the liquid and connected to the valve displacing device.

5. The combination of claim 1 wherein the temperature responsive control means comprises a valve displacing device engageable with the associated second flow control device for admitting liquid from the source into the receptacle, and a sensing element located adjacent the predetermined level of the liquid and connected to the valve displacing device.

6. In combination with a receptacle storing liquid supplied thereto from a source of liquid under pressure, a liquid level controlling apparatus submerged within the liquid comprising an inlet conduit connected to said source, a flow device connected to the inlet conduit for controlling flow of liquid from the source into the receptacle, bias control means connected to the flow control device for opening the same in response to a decrease in liquid in the receptacle below a predetermined level, a second flow control device for conducting liquid from the inlet conduit into the receptacle and temperature responsive control means operatively connected to the second flow control device for preventing flow therethrough until the temperature of the liquid within the receptacle reaches a predetermined limit.

7. In combination with a receptacle storing fluid supplied thereto from a pressurized source, a storage volume controlling apparatus comprising an inlet conduit connected to the source, a flow control device connected to the inlet conduit for controlling inflow of fluid into the receptacle, means connected to the flow control device for opening the same in response to a decrease in volume of the fluid in the receptacle below a predetermined minimum, a second flow control device for conducting fluid from the source into the receptacle and temperature responsive control means operatively connected to the second flow control device for preventing flow therethrough until the temperature of the fluid within the receptacle reaches a predetermined limit.